United States Patent [19]

Hallerbäck

[11] Patent Number: 4,799,918
[45] Date of Patent: Jan. 24, 1989

[54] GEAR WHEEL

[75] Inventor: Stig Hallerbäck, Vastra Frolunda, Sweden

[73] Assignee: SKF Nova AB, Gothenburg, Sweden

[21] Appl. No.: 113,559

[22] Filed: Oct. 27, 1987

[30] Foreign Application Priority Data

Oct. 27, 1986 [SE] Sweden ............................ 8604569

[51] Int. Cl.$^4$ ............................................. F16H 55/00
[52] U.S. Cl. ............................ 474/161; 29/159 R
[58] Field of Search ........ 474/152, 161, 162, 166–170, 474/174; 29/159 R, 159.2, 159 A, 159.3

[56] References Cited

U.S. PATENT DOCUMENTS 3,651,705 3/1972 Bertinetti et al. .................. 474/161
3,696,685 10/1972 Lampredi ............................ 474/161

Primary Examiner—Thuy M. Bui
Attorney, Agent, or Firm—Eugene E. Renz, Jr.

[57] ABSTRACT

The invention relates to a gear wheel consisting of plastic material or a similar material having a coefficient of thermal expansion higher than that of steel. The gear wheel further includes a helix of steel or another material having a coefficient of thermal expansion similar to or identical with that of steel embedded in the gear rim of the wheel radially inside the teeth, whereby the helix has such a strength and dimension that it determines the coefficient of thermal expansion of the gear rim.

5 Claims, 1 Drawing Sheet

GEAR WHEEL

FIELD OF THE INVENTION

The present invention relates to a gear wheel of plastic material and more particularly to such wheels intended for cooperation with a toothed driving belt. The invention also relates to a method of making such gear wheels.

BACKGROUND OF THE INVENTION

Gear wheels are a commonly known machine member and are of many different forms. Typically, they incorporate a rim of teeth, which are intended to cooperate either with corresponding teeth on adjacent gear wheels or with teeth on a toothed driving belt or the like. In the latter case these teeth are rule-shaped and have an axial extension allowing them to cooperate with transverse teeth on the driving belt.

Gear wheels are commonly made from cast iron or steel. The requirements on the design and machining of the teeth are always rigid. In the latter case, as mentioned above, when the teeth are rule-shaped, it is necessary that they are precision machined by milling or the like. Thus gear wheels are given an accurate shape, thereby cooperating in a satisfactory manner with the transverse teeth of the driving belt.

For gear wheels which cooperate with driving belts, it is often desirable that the gear wheel rim be provided with a flange on one or both side to ensure that the driving belt does not disengage from the gear wheel. Since the teeth require machining in a milling operation it is difficult or even impossible to provide the gear rim with the flange prior to the milling operation. In such cases use is therefore made of separate flanges, which after precision machining are fitted in grooves on the side of the gear rim. Gear produced in this manner and from the above-mentioned materials are heavy and expensive to produce.

It has long been a goal to be able to mold gear wheels directly without subsequent machining and from a low weight material. Different types of plastic material have been considered in the past, but the plastic material has the property that its coefficient of thermal expansion is much greater than that of steel and cast iron, whereby unacceptable dimensional changes will arise in connection with temperature changes, as other parts in the vicinity of the plastic material usually consist of steel or cast iron.

SUMMARY OF THE INVENTION

This thermal expansion problem has been solved by the present invention. It is now possible to meet the earlier goals by providing a gear wheel consisting of plastic material of a material having a coefficient of thermal expansion higher than that of steel, i.e. 2.5 to 6 times greater than that of steel, and characterized by having a helix of steel or another material with a coefficient of thermal expansion similar to or identical with that of steel embedded in the gear rim of the wheel radially inside the teeth, whereby the helix has such a strength and dimension that it determines the coefficient of thermal expansion of the toothed wheel rim.

According to the invention the hub of the toothed wheel may be axially displaced in relation to the toothed wheel rim, and also the hub may incorporate a helix of steel or another material with a coefficient of thermal expansion similar to or identical with that of steel and such a strength that it has the ability of determining the coefficient of thermal expansion of the entire hub.

The invention further incorporates a method for production of a gear wheel, which involves inserting a helix of a material having a coefficient of thermal expansion similar to that of steel into a mold, having a somewhat smaller circumferential diameter than the helix, whereupon the mold is filled with the molding material which is caused to become stiff or to be cured.

For securing that the helical spring is entirely embedded in the plastic material it is appropriate according to the invention that some bosses in the mold, e.g. every fifth boss, intended to form tooth bottoms in the gear rim are equipped with a guiding rule for guiding the helix during the molding process prior to the embedding of the helix.

BRIEF DESCRIPTION OF THE DRAWINGS

The invention hereinafter will be further described with reference to the accompanying drawings, in which.

DETAILED DESCRIPTION OF THE PREFERRED EMBODIMENT

Figure 1:
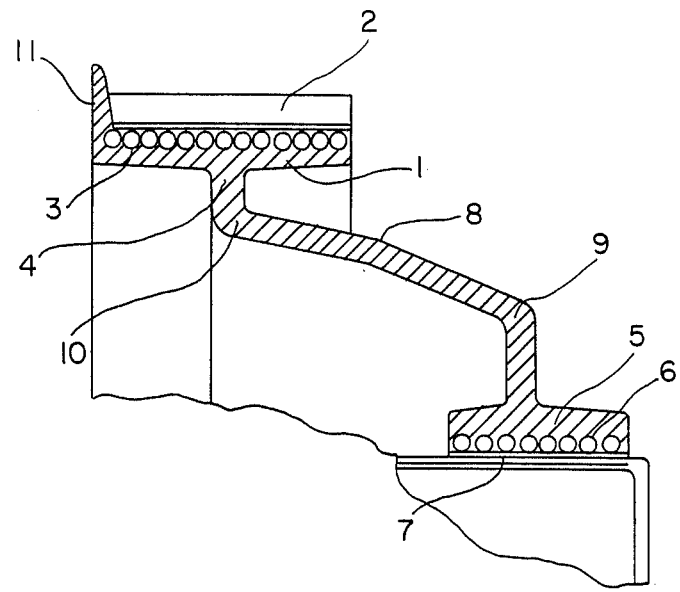
FIG. 1 is an axial section showing a gear according to the invention.

In FIG. 1 is shown a gear wheel having a radius of about 100 mm and incorporating a gear rim 1 with axially extending rule-shaped teeth 2, the length of the teeth having about 40 mm. In the gear rim adjacent its outer circumference there is inserted a helix 3 of steel. This helix is entirely embedded in the plastic molding material 4, but can be seen in some tooth bottoms, e.g. each fifth.

The hub 5 of the gear wheel, such as shown in FIG. 1, is axially displaced relative to the gear rim 1. The hub 5 is equipped with a steel helix 6 or the like at the inner surface 7. This allows the hub to be fitted with an invariable firm grip upon a shaft, which almost always is of steel.

The connecting portion 8 between the gear rim 1 and the hub 5 has been given such a shape with two knees 9 and 10 that temperature variations can be easily absorbed without creation of any stresses. The plastic material of this and other portions may be reinforced with glass fibre or with other known material.

The gear rim 1 according to FIG. 1 as seen is also provided with a flange 11. this can be molded directly in connection with the molding of the entire wheel. From a manufacturing point of view it is also possible to mold a flange 11 on both sides of the gear rim.

Figure 2:
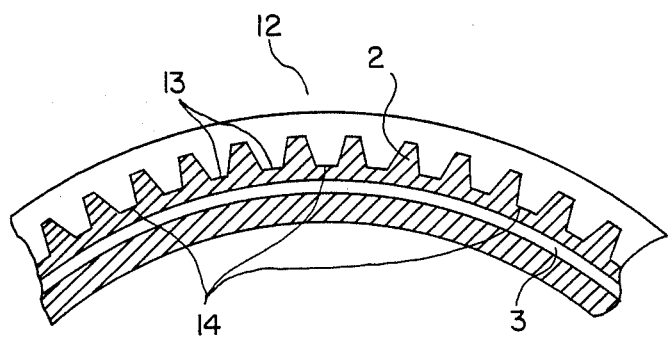
FIG. 2 shows a radial section of a portion of the mold, which gives the gear rim its shape.

In FIG. 2 there is shown a portion of the mold for production of the gear wheel according to the invention. In the outer mold half 12 has been made bosses 13, which bosses are intended to delimit the tooth bottoms in the gear wheel rim 1. Such as shown in the figure each fifth boss 13 is provided with rules 14, which are intended to retain the inserted helix 3 in its position during the molding operation. The helix 3 shall have a natural bigger diameter than the circumferential diameter delimited by the rules 14. The diameter of the thread in the helix, roughly speaking, is about one-third of the thickness of the plastic layer. During molding, the helix 3 will engage at a slight pressure against the rules 14, and the helix 3 will be entirely embedded in plastic material except for at the points of engagement with the rules 14.

By the present invention there is thus obtained a gear wheel, which has a low weight, which can be molded directly and which is finished without precision machining and which without extra costs during the molding can be provided with one or two flanges beside the gear rim. The gear wheel also has the same coefficient of thermal expansion as steel. It is essential that the mutual distances between the teeth are exactly equal. According to the invention, this is achieved without any subsequent machining whatsoever.

The invention is not limited to the embodiment shown but can be varied in different manners within the scope of the claims. It is thus not necessary that the teeth are rule-shaped. Other designs may also be applicable and the rules do need to have a straight axial direction. The surface of the wheel may also be without the teeth. It may be plane or convex. The molding material need not consist of a plastic material but can be another material such as, for example, aluminum.

What is claimed is:

1. A gear wheel having a gear rim and teeth and consisting of plastic material or a material having a coefficient of thermal expansion greater than that of steel, said gear wheel having a helix of steel or another material having a coefficient of thermal expansion similar to or identical with that of steel embedded in said gear rim of the wheel radially inside the teeth, whereby the helix has such a strength and dimension that it determines the coefficient of thermal expansion of the gear rim.

2. A gear wheel as claimed in claim 1, wherein said gear wheel includes a hub and wherein having the hub of the gear wheel axially is displaced in relation to the gear rim.

3. A gear wheel as claimed in claim 1, wherein said gear wheel includes a hub and wherein said hub incorporates a helix of steel or another material with a coefficient of thermal expansion similar to or identical with that of steel and such a strength that it has the ability of determining the coefficient of thermal expansion of the entire hub.

4. A method for producing a gear wheel made of plastic having an annular rim and a helix of a material having a coefficient of thermal expansion similar to or identical to steel in the gear rim adjacent its peripheral surface consisting of the steps of inserting the helix into a mold having a somewhat smaller circumferential diameter than the helix and filling the mold with the plastic material until cured.

5. A method as claimed in claim 4, characterized in that prior to the inserting of the helix, some bosses in the mold, intended to form tooth bottoms in the gear rim are equipped with a guiding rule for guiding the helix during the molding process.

* * * * *